(12) United States Patent
Koehler et al.

(10) Patent No.: US 11,047,370 B1
(45) Date of Patent: Jun. 29, 2021

(54) SHAPE MEMORY ALLOY SUBSURFACE ARRAY DEPLOYMENT MECHANISM

(71) Applicant: Raytheon Company, Waltham, MA (US)

(72) Inventors: Frederick B. Koehler, Tucson, AZ (US); Curtis B. Carlsten, Seekonk, RI (US); Ward D. Lyman, Tuscon, AZ (US); Jason E. Gaudette, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/884,755

(22) Filed: May 27, 2020

(51) Int. Cl.
*F03G 7/06* (2006.01)
*G01V 1/38* (2006.01)
*G01V 1/20* (2006.01)

(52) U.S. Cl.
CPC ............. *F03G 7/065* (2013.01); *G01V 1/201* (2013.01); *G01V 1/3843* (2013.01)

(58) Field of Classification Search
CPC .......... F03G 7/065; G08B 7/00; G01V 1/201; G01V 1/3843
USPC .................................................... 60/526–528
See application file for complete search history.

(56) References Cited

U.S. PATENT DOCUMENTS

| | | | | |
|---|---|---|---|---|
| 4,998,688 | A * | 3/1991 | Longerich | H01H 61/0107 244/3.16 |
| 6,447,478 | B1 * | 9/2002 | Maynard | F03G 7/065 600/151 |
| 2015/0230742 | A1 * | 8/2015 | Silver | A61B 5/0205 600/348 |
| 2016/0313467 | A1 * | 10/2016 | Davoodi | G08C 19/00 |
| 2017/0026634 | A1 * | 1/2017 | Mirlay | H04N 13/239 |
| 2018/0134191 | A1 * | 5/2018 | Ketels | B60N 2/0224 |
| 2019/0326501 | A1 * | 10/2019 | Gilbert | H01L 39/126 |

* cited by examiner

*Primary Examiner* — Shafiq Mian (74) *Attorney, Agent, or Firm* — Renner, Otto, Boisselle & Sklar, LLP (57) ABSTRACT

A deployment body for a sensor array includes at least one superelastic spring formed of a shape memory alloy (SMA) material that enables activation of the deployment body. The SMA spring is configured to expand from a stowed position in which the SMA spring is wound around a central hub of the deployment body to a deployed position in which the SMA spring is extended in a radially outward direction relative to the central hub. A stiffness of the SMA spring enables the SMA spring to hold cables of the sensor array and maintain a deployed shape of the sensor array, which may be a volumetric array. Using the SMA material is advantageous in that the material is tuned to maintain superelasticity based on at least one of an intended operating temperature and a desired expansion ratio of stowed to deployed diameter of the deployment body.

20 Claims, 6 Drawing Sheets

SHAPE MEMORY ALLOY SUBSURFACE ARRAY DEPLOYMENT MECHANISM

FIELD OF THE INVENTION

The invention relates to a system and method of deploying sensor arrays.

DESCRIPTION OF THE RELATED ART

Various applications may use sensor arrays. An exemplary sensor array includes a hydrophone array. A hydrophone array may be implemented in a sonobuoy that is dropped or ejected from an aircraft or a ship. The sonobuoy and the array may be dropped into an environment for acoustic observation. For example, the sonobuoy may be dropped in the ocean for underwater acoustic research. A sonobuoy may be used in military applications, such as in anti-submarine warfare. After the sonobuoy reaches the intended environment, the sensor array is deployed from the sonobuoy. During deployment, the sensor array may expand from a compacted structure to an expanded structure in which the sensor array is operable to perform the intended function, such as underwater surveillance.

Prior attempts to deploy hydrophone arrays include using complex rigid structures to support the shape of the array and external actuation devices such as motors, pumps and extra batteries. Using the rigid structures and external actuation devices may be a disadvantage for small-sized sonobuoys due to space constraints. Another disadvantage of using the rigid structures is that the structures provide limited deployment options for the sensors and thus limited directionality for the sensor array.

SUMMARY OF THE INVENTION

According to the present application, in a general embodiment, a deployment body for a sensor array includes at least one superelastic spring formed of a shape memory alloy (SMA) material that enables activation of the deployment body. The SMA spring is configured to expand from a stowed position in which the SMA spring is wound around a central hub of the deployment body to a deployed position in which the SMA spring is extended in a radially outward direction relative to the central hub. A stiffness of the SMA spring enables the SMA spring to hold cables of the sensor array and maintain a deployed shape of the sensor array, which may be a volumetric array. Using the SMA material is advantageous in that the material is tuned to maintain superelasticity based on at least one of an intended operating temperature range and a desired expansion ratio of stowed to deployed diameter of the deployment body, depending on a particular application.

Using the SMA material enables the deployment body to have a less complex structure that enables deployment, in contrast to the prior attempts that use more complex rigid structures. The SMA spring may be configured for passive or active activation. During passive activation, the SMA spring is configured to have stored strain energy when in the stowed position and the strain energy is released during the passive activation. Passively activating the deployment body is advantageous in providing a reliable deployment for the sensor array, in contrast to prior attempts that require additional activation devices or methods. In exemplary applications, such as in underwater applications, the passive activation may occur via ejection from a radially restrained sonobuoy cylinder into an unrestrained free space of the aqueous environment.

In other exemplary applications, such as in space, active activation of the SMA spring may occur via heating or in response to a current being applied to the SMA material. Active activation of the SMA spring and thus active deployment may be advantageous in space due to the deployment being performed with a controlled battery signal or orientation of the deployment body relative to the sun such that the energy therefrom may be used to heat the deployment body.

The deployment body may include a plurality of SMA springs that are configured for counterrotation during deployment, or alternatively, rotation in the same direction. When the deployment body is configured to have a cylindrical or disk shape, radial SMA springs and circumferential SMA springs may be provided. The SMA springs may be formed to have different spring rates. In another embodiment of the deployment body, a single SMA spring may be used.

Operation of the deployment body may be configured for different applications by modifying a cant angle between the SMA spring and the central hub of the deployment body. The cant angle may be determined based on an expansion ratio from the stowed position of the deployment body to the deployed position of the deployment body so as to maintain a predetermined strain rate during stowage while also accommodating the stiffness of the SMA spring when the SMA spring is in the deployed state. The stiffness of the SMA springs may also be adjusted. For example, protrusions may be formed in the cross-sections of the SMA springs and the thickness of the SMA springs may be varied.

According to an aspect of the invention, a deployment body for a sensor array is formed of an SMA material.

According to an aspect of the invention, a deployment body includes a central hub and a plurality of SMA springs that are both formed of nitinol.

According to an aspect of the invention, a deployment body for a sensor array includes a plurality of counterrotating SMA springs.

According to an aspect of the invention, a deployment body for a sensor array is configured for passive activation during deployment.

According to an aspect of the invention, a deployment body for a sensor array includes radial SMA springs and circumferential SMA springs that have different spring rates.

According to an aspect of the invention, a method of forming an deployment body includes tuning the SMA material to maintain a predetermined superelasticity based on at least one of an operating temperature and an expansion ratio of stowed to deployed diameter of the deployment body.

According to an aspect of the invention, a deployment body is engageable with a sensor array for deploying the sensor array and includes a central hub, and at least one spring connected between the central hub and the sensor array, the spring being expandable from a stowed position in which the spring is wound around the central hub and a deployed position in which the spring is expanded radially outwardly from the central hub to maintain a deployed shape of the sensor array. The spring is formed of a shape memory alloy material that enables activation of the spring in which the spring expands from the stowed position toward the deployed position.

According to an embodiment of any paragraph(s) of this summary, the spring is configured for passive activation and has stored strain energy when in the stowed position, and wherein the strain energy is released during the passive activation of the spring.

According to an embodiment of any paragraph(s) of this summary, the shape memory alloy material is configured for active activation when the shape memory alloy material is heated.

According to an embodiment of any paragraph(s) of this summary, the shape memory alloy material is configured for active activation in response to a current being applied to the shape memory alloy material.

According to an embodiment of any paragraph(s) of this summary, the shape memory alloy material is a nickel-titanium alloy.

According to an embodiment of any paragraph(s) of this summary, the at least one spring includes a plurality of springs.

According to an embodiment of any paragraph(s) of this summary, the plurality of springs includes at least two springs that are configured to counterrotate relative to each other during the activation.

According to an embodiment of any paragraph(s) of this summary, the plurality of springs includes a plurality of clockwise rotating springs and a plurality of counterclockwise rotating springs.

According to an embodiment of any paragraph(s) of this summary, the plurality of springs are all configured to rotate in a same rotational direction during the activation.

According to an embodiment of any paragraph(s) of this summary, the at least one spring includes a plurality of radial springs and a plurality of circumferential springs that have different spring rates.

According to an embodiment of any paragraph(s) of this summary, the deployment body includes a plurality of staves, wherein the circumferential springs are connected between the staves for spacing the staves when in the deployed position.

According to an embodiment of any paragraph(s) of this summary, each of the radial springs is connected between the central hub and one of the staves.

According to an embodiment of any paragraph(s) of this summary, the plurality of springs are arranged in a symmetrical pattern when in the deployed position.

According to an embodiment of any paragraph(s) of this summary, the at least one spring includes only one spring that is rotatable in one rotational direction.

According to another aspect of the invention, a deployment module includes a sensor array having a plurality of sensors and a cable connecting the plurality of sensors, and a deployment body arranged adjacent the sensor array and having a central hub, and a plurality of springs connected between the central hub and the cable of the sensor array, the springs being expandable from a stowed position in which the springs are wound around the central hub and a deployed position in which the springs are expanded radially outwardly from the central hub to maintain a deployed shape of the sensor array. The springs are formed of a shape memory alloy material that enables activation of the spring in which at least two of the springs are configured to counterrotate relative to each other during expansion from the stowed position toward the deployed position.

According to still another aspect of the invention, a method of forming a deployment body that is engageable with a sensor array for deploying the sensor array includes forming at least one spring of a shape memory alloy material, tuning the shape memory alloy material to maintain a predetermined superelasticity based on at least one of an operating temperature for the deployment body and a predetermined expansion ratio of stowed to deployed diameter of the deployment body, securing the spring to a central hub, and winding the spring around the central hub.

According to an embodiment of any paragraph(s) of this summary, the method includes determining a cant angle between the spring and the central hub based on the predetermined expansion ratio, and securing the spring to the central hub at the determined cant angle.

According to an embodiment of any paragraph(s) of this summary, the method includes adjusting a stiffness of the spring by at least one of forming a protrusion in the spring to change a cross-section of the spring, and changing a thickness of the spring.

According to an embodiment of any paragraph(s) of this summary, the method includes forming the spring of the shape memory alloy material at a first temperature, and winding the spring around the central hub at a second temperature different than the first temperature.

According to an embodiment of any paragraph(s) of this summary, the method includes winding the spring around the central hub includes bending the spring at a minimal bend radius to prevent plastic deformation of the shape memory alloy material.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have particular application in deployable sensor systems used for sensing extremely large environments or environments that are not easily accessible. Exemplary environments include underwater, air, and space, and exemplary deployable sensor systems include hydrophones, RF antennas, and solar arrays. Military applications, such as anti-submarine warfare, or non-military applications, such as underwater acoustic research applications, may be suitable applications. The principles described herein may be adapted to any suitable platform from which the sensor array is deployed, such as an aircraft, sea vessel, or land vehicle. Many other sensor systems, environments, and platforms may be suitable.

Figure 1:
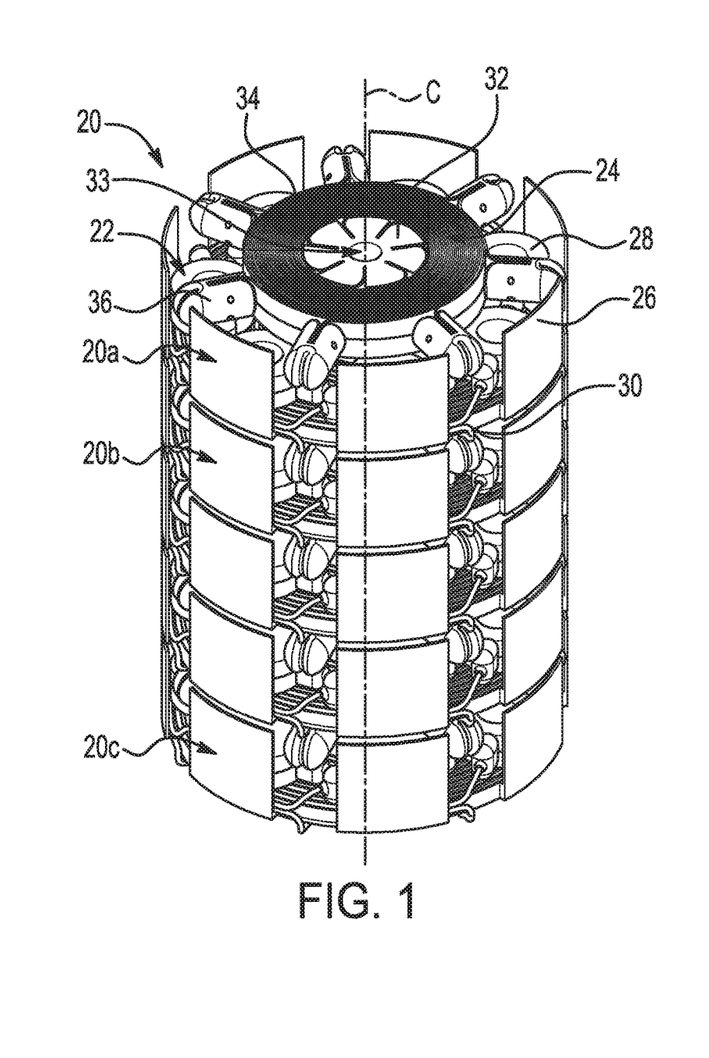
FIG. 1 shows an oblique view of a deployment module for a sensor array that includes a shape memory alloy (SMA) deployment body.
Figure 2:
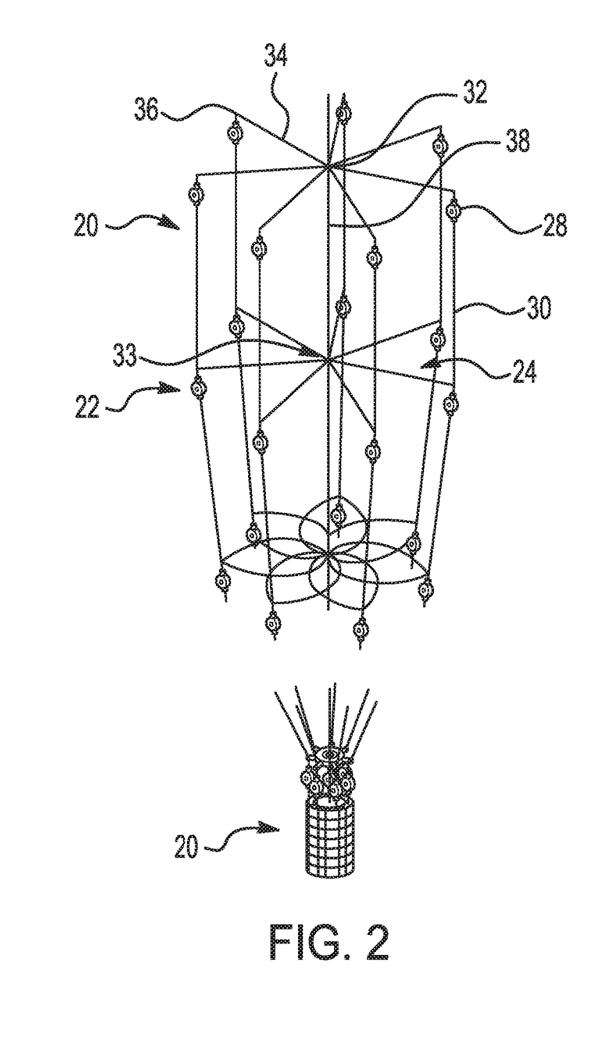
FIG. 2 shows the deployment module of FIG. 1 during deployment.

Referring first to FIGS. 1 and 2, an exemplary deployment module 20 for a sensor array 22 includes a deployment body 24 and may include any suitable support shell 26. FIG. 1 shows the deployment module 20 in a stowed state in which the sensor array 22 and the deployment body 24 are supported in the support shell 26 prior to deployment of the deployment module 20. FIG. 2 shows the deployment module 20 during deployment. The deployment body 24 and the sensor array 22 may be axially stacked in the support shell 26 along a central axis C. The deployment module 20 may be cylindrical in shape such that the central axis C is a longitudinal axis of the deployment module 20. Other volumetric shapes may be suitable for the deployment module 20 and the shape is dependent on the application. For example, spherical, rectangular, pentagonal, hexagonal, or other polygonal shapes may be suitable.

The sensor array 22 includes a plurality of sensors 28 and a cable 30 that connects the plurality of sensors 28 to form the sensor array 22. Any number of sensors 28 and arrangement of the sensors 28 may be used. The sensor array 22 may be a hydrophone array and the sensors 28 may be hydrophones, such as piezoelectric transducers. Other sensors may be suitable for the sensor array 22, such as acoustic sensors, optical sensors, or RF elements. Any sensors that is configured to detect environmental characteristics, such as pressure, temperature, depth, or distance, may also be suitable. Each sensor 28 is connected to an adjacent sensor by a segment or length of the cable extending between axial ends of the sensors.

The deployment module 20 may be modular in that the deployment module 20 is formed of a plurality of deployment sub-modules 20a, 20b, 20c that are axially stacked. The modular deployment module 20 includes a plurality of deployment bodies 24 that each correspond to one of the deployment sub-modules 20a, 20b, 20c such that each deployment sub-module 20a, 20b, 20c is separately deployed. Each deployment body 24 may be the same in shape, size, and general structure. During deployment, the deployment sub-modules 20a, 20b, 20c may be sequentially deployed by sequential activation and removal of the deployment bodies 24 relative to the deployment module 20.

In an exemplary application, the deployment module 20 has a vertical orientation during deployment, such that an uppermost deployment sub-module 20a is first deployed and the remaining deployment sub-modules 20b, 20c are deployed until a lowermost deployment sub-module 20c is emptied of the sensors 28 and the entire sensor array 22 is deployed. In other exemplary applications, deployment of the deployment sub-modules 20a, 20b, 20c occurs from the lowermost deployment sub-module 20c and continues upwardly to the uppermost deployment sub-module 20a. Other deployment sequences and arrangements of the deployment module may be suitable as required for a particular application.

Each deployment body 24 includes a central hub 32 and at least one spring 34 secured to the central hub 32. During deployment, each deployment body 24 is expandable from the stowed position, as shown in FIG. 1, in which the overall shape of the deployment body 24 is contracted and has a minimal volume. The deployment body 24 is configured to passively or actively deploy the sensor array 22 from the support shell 26 in that external actuation devices may be eliminated. The expansion occurs radially outwardly relative to a center 33 of the deployment body 24. The center 33 of the deployment body 24 is arranged along the central axis C of the deployment module 20 when the deployment module 20 is in the stowed position. The deployment body 24 may be removed from the deployment module 20 prior to or simultaneously with the expansion of the deployment module 20 such that the center 33 of the deployment body 24 will be offset from the central axis C during deployment.

The deployment body 24 expands via the material properties and chemistry of the material in the deployment body 24. The spring 34 may be formed of a superelastic shape memory alloy (SMA) that enables the passive activation of the deployment body 24, such as in underwater applications, or active activation of the deployment body 24, such as in space or terrestrial applications. Due to the temperature-induced phase transformation properties of the SMA, the SMA spring 34 is configured to expand from the stowed position, in which the SMA spring 34 is wound around the central hub 32, to a deployed position. In the deployed position, the SMA spring 34 is extended and the deployment body 24 has the expanded shape corresponding to a regular or normal shape of the SMA spring 34.

The stiffness of the SMA spring 34 in the deployed position enables the SMA spring 34 and thus the deployment body 24 to remain in the deployed position. The deployment body 24 further includes a cable-engaging arm or stave 36 that is formed to engage the sensor array 22. For example, the stave 36 holds the cable 30 of the sensor array 22 to maintain an expanded shape of the deployed sensor array 22 during operation of the sensors 28, such as the expanded shape shown in FIG. 2.

A suitable SMA material for the SMA spring 34 includes nickel-titanium alloys, such as nitinol. Copper-aluminum-nickel alloys may be suitable. Copper aluminum or nickel titanium hafnium may be suitable. Other SMA alloys that may be suitable include zinc, copper, gold, or iron. The material is dependent on the application and the desirable properties of the deployment body 24 that are required for the application. Using the SMA material instead of conventional steel spring material advantageously provides 10 to 20 times more strain capability for the deployment body 24. The SMA material and thus the SMA spring 34 is tunable in that the exact material may be selected to maintain super-elasticity for at least one of a predetermined operating range of temperature and an expansion ratio of stowed to deployed diameter as required by a particular application.

The SMA spring 34 is formed to store strain energy when in the stowed state such that the passive activation is enabled by releasing the stored strain energy when the deployment module 20 reaches the intended environment for deployment. The SMA spring 34 may be formed to undergo a phase transformation. The SMA spring 34 may be cooled through the phase transformation to more easily form the SMA spring 34 into the stowed position for active or passive deployment.

During active deployment, additional heat may be applied to the deployment module 20 when the deployment module 20 is in the intended environment, such as in a space or terrestrial application. The deployment may be performed with a controlled battery signal or orientation of the deployment body 24 relative to the sun such that the energy therefrom may be used to heat the deployment body 24. The SMA spring 34 may be activated in response to a signal during which a current is applied to the SMA spring 34 for heating the SMA. Using the signal for activation may be advantageous in enabling a slow heating of the SMA and thus a slower expansion of the SMA spring 34 and deployment of the sensor array 22 into the deployed shape.

As shown in FIG. 2, the deployed shape of the sensor array 22 and the deployment body 24 may be three-dimensional. Alternatively, the deployed shape may be two-dimensional in which the deployment body 24 is flat and the sensors 28 are arranged in a same plane. The precise shape of the deployment body 24 and the deployed shape of the sensor array 22 is dependent on the application and many different shapes may be suitable. The deployed shape may be symmetrical. Exemplary deployed shapes include cylindrical, rectangular, triangular, pentagonal, hexagonal, or any other suitable polygonal shape. In other exemplary embodiments, the deployed shape may be asymmetrical such that the sensors 28 have a non-ordered arrangement. For example, sensors 28 arranged in a quadrant or cylindrical shaped portion of a volumetric sensor array 22 may have a different spacing as compared with the spacing between sensors 28 in another region of the volumetric sensor array 22.

When in the deployed position, the sensor array 22 may have a vertical orientation such that the sensors 28 are spaced vertically to provide directionality of the sensor array 22. A plurality of deployment bodies 24 may be axially spaced in the sensor array 22. A central electro-mechanical cable 38 may be provided as a strength member that defines a central axis of the deployed sensor array 22 and retains an axial spacing of the central hubs 32 for each deployment body 24. Power for the cable 30 of the sensor array 22 may also be provided by the central electro-mechanical cable 38 via a portion of the cable 30 being connected to the central electro-mechanical cable 38.

Figure 3:
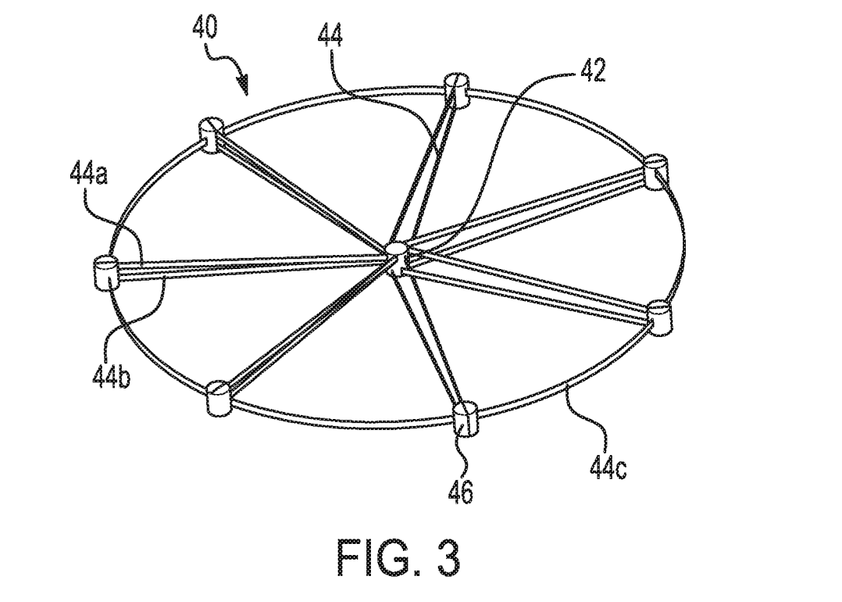
FIG. 3 shows an oblique view of an SMA deployment body for the sensor array of FIG. 1 according to another exemplary embodiment.
Figure 4:
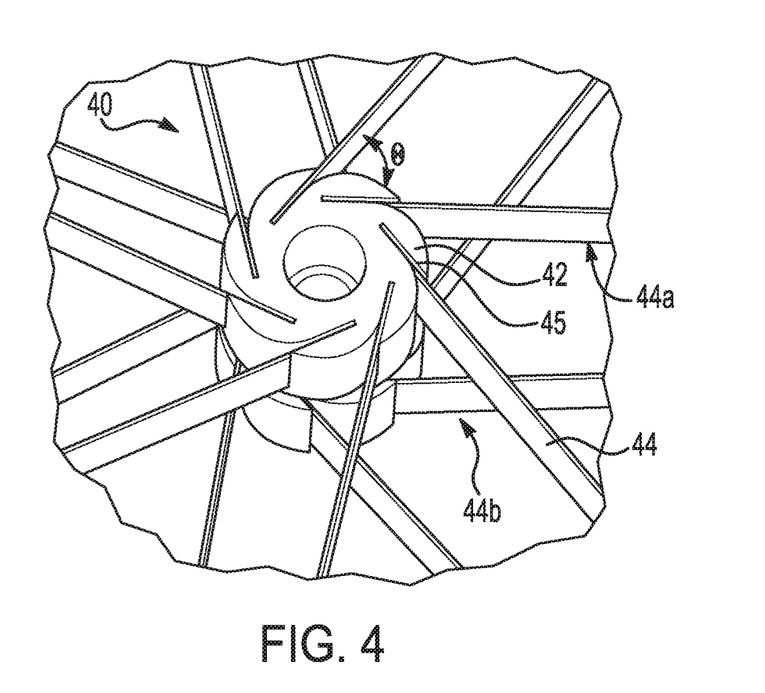
FIG. 4 shows a detailed oblique view of the deployment body of FIG. 3.

Referring now to FIGS. 3 and 4, a deployment body 40 according to another exemplary embodiment is shown. The deployment body 40 is similar to the deployment body 24 shown in FIGS. 1 and 2 and suitable for use with any suitable sensor array, such as the sensor array 22. The deployment body 40 includes a central hub 42 and at least one SMA spring 44 connected to the central hub 42. The central hub 42 may be formed of any suitable material, which may be the same material as the SMA spring 44. For example, both the central hub 42 and the SMA spring 44 may be formed of nitinol, or any other suitable SMA material, such as copper aluminum or nickel titanium hafnium. Any suitable shape may be used for the central hub 42, such as a cylindrical shape which enables the central hub 42 to spin during activation.

The size and dimensions of the central hub 42 may be dependent on the application and the number of SMA springs 44 secured to the central hub 42. If the central hub 42 is formed to have a cylindrical shape, the central hub 42 may have a diameter that is between 1.27 and 3.81 centimeters (between 0.50 and 1.50 inches). The longitudinal length of the central hub 42 may correspond to the width of the SMA spring 44 as the width of the SMA spring 44 may extend in the same longitudinal direction in which the central hub 42 extends. As best shown in FIG. 4, the longitudinal length of the central hub 42 may be equal to approximately two times the width of the SMA spring 44. A first set of SMA springs 44a may be disposed along a circumference of the central hub 42 corresponding to a first axial width of the central hub 42, and a second set of SMA springs 44b may be disposed along a circumference of the central hub 42 that corresponds to a second axial width of the central hub 42 adjacent the first axial width. In a vertical orientation of the deployment body 40, the first set of SMA springs 44a may be upper springs and the second set of SMA springs 44b may be lower springs.

The thickness of the SMA springs 44 corresponds to a desired stiffness for the SMA springs 44. In an exemplary embodiment, the SMA springs 44 may have a thickness that is between 0.015 and 0.025 centimeters (between 0.006 and 0.010 inches) and a width that is between 0.76 and 1.27 centimeters (between 0.30 and 0.50 inches). Other thicknesses may be suitable and a greater thickness may be used to induce more strain in the SMA springs 44 when the SMA springs 44 are compressed into the initial stowed position. The SMA springs 44 and the central hub 42 may be sized up or down depending on the application.

Any number of SMA springs 44 may be used and the SMA springs 44 may have any suitable arrangement along the central hub 42. The central hub 42 may be formed to define a plurality of slots 45 that grab, clamp, bite into, or otherwise retain the ends of the SMA springs 44. The slots 45 may be formed to define a predetermined cant angle $\theta$ between a corresponding SMA spring 44 and the central hub 42. Each SMA spring 44 may be arranged relative to the central hub 42 by the same cant angle $\theta$, or alternatively, different cant angles 8. The cant angle $\theta$ may be determined based on an expansion ratio from the stowed position of the deployment body 40 to the deployed position of the deployment body 40 so as to maintain a predetermined strain rate during stowage while also accommodating the stiffness of the SMA spring 44 when the SMA spring 44 is in the deployed state. The cant angle $\theta$ may be less than 90 degrees.

The at least one SMA spring 44 may include a plurality of radial SMA springs 44a, 44b that extend radially outwardly from the central hub 42 when the radial SMA springs 44a, 44b are in the deployed position, as shown in FIG. 3. The radial SMA springs 44a, 44b may spiral outwardly. A uniform or staggered deployment may be provided. The radial SMA springs 44a, 44b may be the same such that each radial SMA spring 44a, 44b has the same shape, size, and material properties. Any arrangement of the SMA springs 44a, 44b may be suitable. The radial SMA springs 44a, 44b may have an ordered arrangement in which each radial SMA spring 44a, 44b is equidistantly spaced from and along the central hub 42. In other exemplary embodiments, the radial SMA springs 44a, 44b may have an unordered arrangement in which the radial SMA springs 44a, 44b have an uneven spacing. The spacing of the radial SMA springs 44a, 44b is dependent on the desired shape and directionality of the deployed sensor array. If the deployed shape is a shape other than cylindrical or spherical, the SMA springs 44a, 44b may be connecting springs that are non-radial.

The radial SMA springs 44a, 44b may include a first set of radial SMA springs 44a that are configured to rotate in a first rotational direction during deployment and a second set of radial SMA springs 44b that are configured to rotate in a second rotational direction during deployment, such that the radial SMA springs 44a, 44b are counterrotating springs that rotate in both clockwise and counterclockwise directions. Alternatively, all of the springs, such as the first set of radial SMA springs 44a or the second set of radial SMA springs 44b, may be arranged to rotate in the same rotational direction. In still another exemplary embodiment of the deployment body, a single SMA spring 44 may be used and configured to rotate in a single rotational direction during deployment.

As shown in FIG. 3, the deployment body 40 further includes outer SMA springs 44c that define an outer perimeter of the deployment body 40 when in the deployed state. If the deployment body 40 is configured to form a circular shape when deployed, the outer SMA springs 44c may be in the form of circumferential SMA springs 44c that extend between the radial SMA springs 44a, 44b. The circumferential SMA springs 44c may be formed of the same material as the radial SMA springs 44a, 44b and have a different spring rate as compared with the radial SMA springs 44a, 44b. The spring rate will be dependent on an amount of load that the different SMA springs 44a, 44b, 44c will endure in a particular environment.

Each circumferential SMA spring 44c may be the same in shape and size and the circumferential SMA springs 44c define an outer circumference of the deployed deployment body 40. In an exemplary embodiment, the diameter defined by the circumferential SMA springs 44c may be between 50.8 and 76.2 centimeters (between 20 and 30 inches). The length of each radial SMA spring 44a, 44b may be about half of the diameter defined by the circumferential SMA springs 44c.

The circumferential SMA springs 44c are configured to position a plurality of staves 46 that are connected between all of the SMA springs 44 and the sensor array (similar to the staves 36 shown in FIG. 2). The staves 46 may be equidistantly spaced via the circumferential SMA springs 44c. Any number of staves 46 may be provided, such as between three and ten staves, and each stave 46 may be the same in shape and size. Any shape may be suitable, such as a cylindrical shape that facilitates spinning of the entire deployment body 40 during deployment. A thermoplastic polymeric material, such as acrylonitrile butadiene styrene (ABS) may be a suitable material for the staves 46. Other materials that are suitable to withstand the intended deployment environment may also be suitable. Each stave 46 may be connected to at least one radial SMA spring 44a, 44b and between two adjacent circumferential springs 44c. Two counterrotating radial SMA springs 44a, 44b may extend between the central hub 42 and one stave 46.

Figure 5:
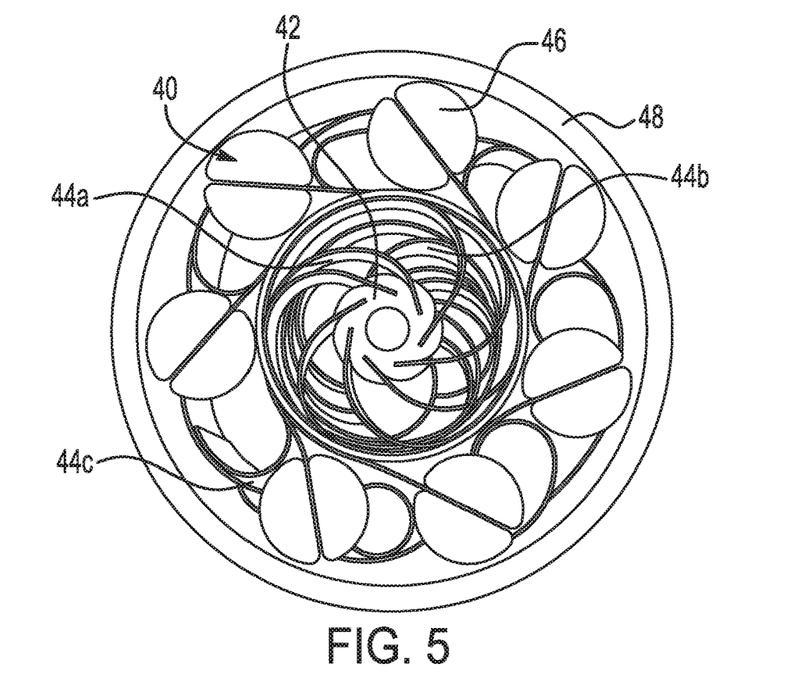
FIG. 5 shows a top view of the deployment body of FIG. 3 during assembly of the deployment body into a stowed position.
Figure 6:
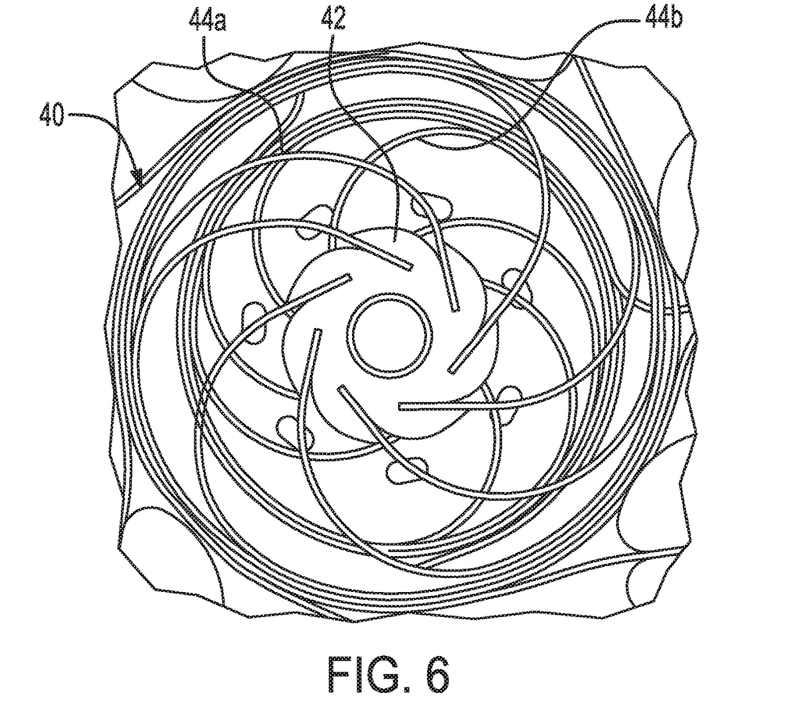
FIG. 6 shows a detailed top view of the deployment body of FIG. 5.
Figure 7:
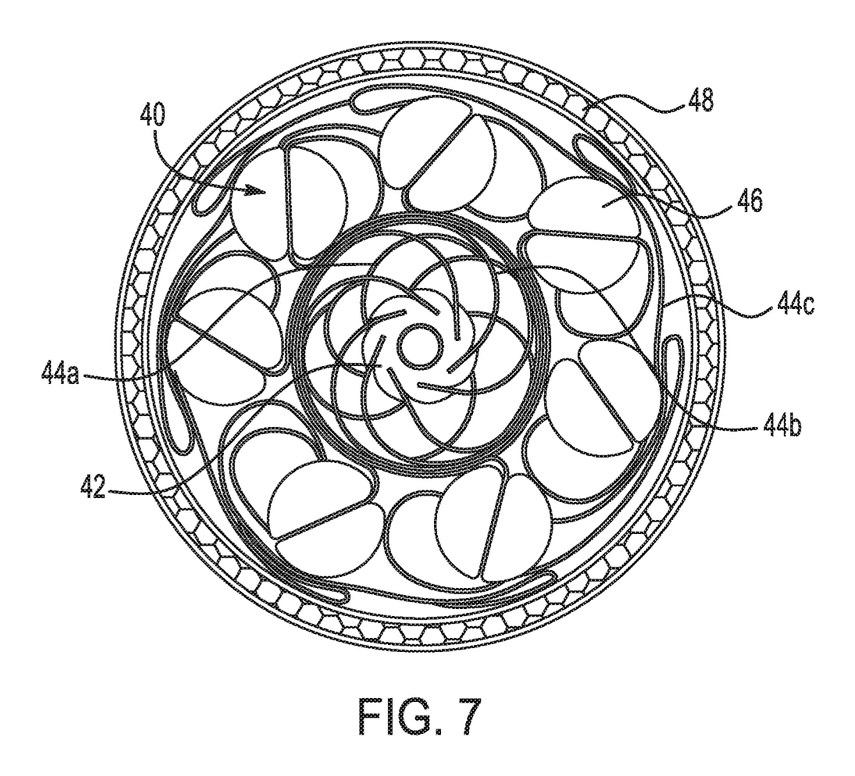
FIG. 7 shows a bottom view of the deployment body of FIG. 3.

Referring in addition to FIGS. 5-7, assembly of the deployment body 40 into the stowed state is shown. FIGS. 5 and 6 show a top view and a detailed top view, respectively, of the deployment body 40. FIG. 7 shows a bottom view of the deployment body 40. During assembly, the central hub 42 is positioned within an envelope 48 which may correspond in size to the deployment module in which the deployment body 40 will be assembled. The envelope 48 may be any suitable rigid structure. In an exemplary embodiment, the diameter of the envelope 48 may be between 10.2 and 12.7 centimeters (between 4.0 and 5.0 inches). The deployment body 40 may be formed in the deployed position and then compressed into the envelope 48 to the stowed position. The size of the deployment body 40 in the stowed position may be between 15 and 25% of the size of the deployment body 40 in the deployed position.

The staves 46 may be formed by any suitable manufacturing process, such as an additive manufacturing process suitable for use with the ABS material of the staves 46. The staves 46 may be formed of hemi-cylindrical portions that grab the radial SMA springs 44a, 44b between the hemi-cylindrical portions by rotation of the staves 46. The radial SMA springs 44a, 44b and the staves 46 may be secured via any suitable attachment or securement method. For example, the staves 46 may clamp on to the radial SMA springs 44a, 44b or the staves 46 may be pinned to the radial SMA springs 44a, 44b. If the deployment body 40 is configured to include the circumferential SMA springs 44c, the circumferential SMA springs 44c may also be secured to the staves 46 at a point along the circumference of the corresponding stave 46 that is between locations at which the radial SMA spring 44a, 44b extends from the stave 46.

After the staves 46 are secured to the SMA springs 44a, 44b, 44c, any suitable tooling may be used to coil the SMA springs 44a, 44b, 44c about the central hub 42. The coiling of the SMA springs 44a, 44b, 44c may be performed at a second lower temperature as compared to a first higher temperature of the assembly environment during attachment of the staves 46 to the SMA springs 44a, 44b, 44c. Lowering the temperature is advantageous in that the temperature phase of the SMA material may be changed to enable easier coiling of the SMA springs 44a, 44b, 44c. A specific alloy composition of the SMA material may also be selected to facilitate compression of the SMA springs 44a, 44b, 44c during assembly.

The lengths of the radial SMA springs 44a, 44b are adjusted to achieve a particular circumference of the deployed deployment body 40. Using the radial SMA springs 44a, 44b enables adjustability at the attachment points with the staves 46. During rotation of the staves 46 for coiling the SMA springs 44a, 44b, 44c, a minimum bend radius is determined for the SMA springs 44a, 44b, 44c based on the SMA material and desired properties. During assembly, the SMA springs 44a, 44b, 44c are not bent below the minimum bend radius to maintain the elasticity of the SMA springs 44a, 44b, 44c and prevent deformation of the SMA material. Advantageously, the SMA springs 44a, 44b, 44c are compressed without kinking of the material. The first and second sets of SMA springs 44a, 44b may be compressed equally. As best shown in FIG. 7, the circumferential SMA springs 44c are tightly compressed along the diameter of the envelope 48.

Figure 8:
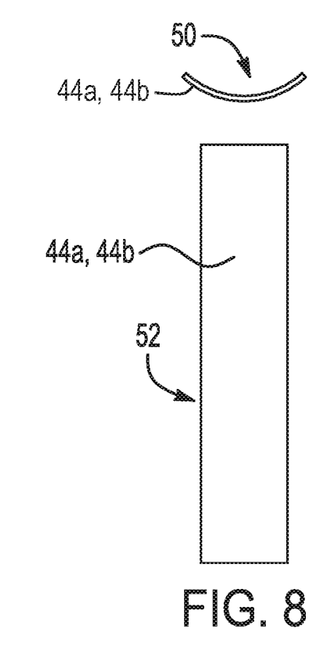
FIG. 8 shows a radial SMA spring of the deployment body of FIG. 3 according to an exemplary embodiment.
Figure 9:
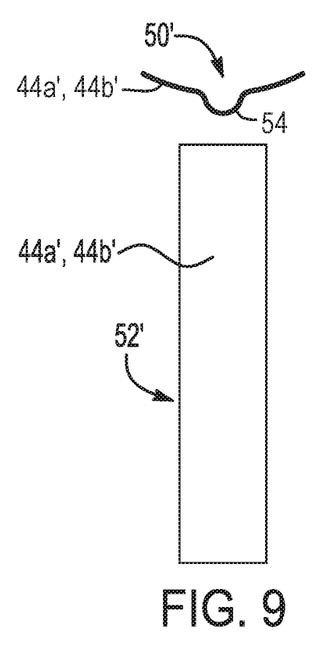
FIG. 9 shows a radial SMA spring of the deployment body of FIG. 3 according to another exemplary embodiment.
Figure 10:
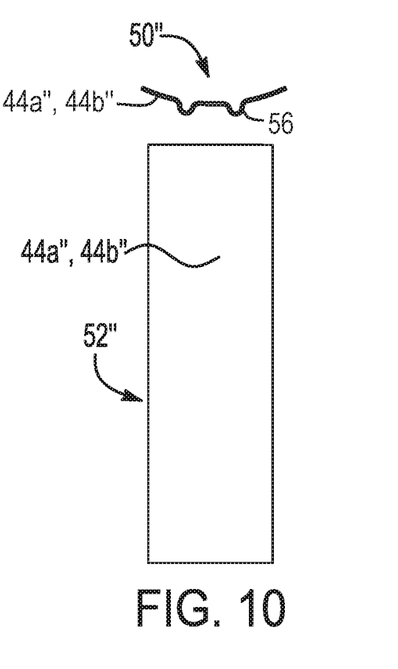
FIG. 10 shows a radial SMA spring of the deployment body of FIG. 3 according to still another exemplary embodiment.

Referring now to FIGS. 8-10, an embodiment of the deployment body may only include radial SMA springs 44a, 44b without circumferential or outer SMA springs. The force on the SMA circumferential springs may be reduced by adjusting a cross-section of the radial SMA springs 44a, 44b to adjust the stiffness of the radial SMA springs 44a, 44b. As shown in FIG. 8, the radial SMA springs 44a, 44b may be shape-set to have a cupped cross-section 50. A top view 52 of the radial SMA springs 44a, 44b having the cupped cross-section 50 is also shown in FIG. 8.

FIGS. 9 and 10 show other exemplary embodiments of the radial SMA springs 44a', 44b', 44a", 44b" in which protrusions are formed in the cupped cross-section to further adjust the stiffness. FIG. 9 shows the radial SMA springs 44a', 44b' having a center protrusion 54 extending from the cupped cross-section 50'. The top view 52' of the radial SMA springs 44a', 44b' having the cupped cross-section 50' with the center protrusion 54 is also shown in FIG. 9. FIG. 10 shows the radial SMA springs 44a", 44b" having at least two protrusions 56 extending from the cupped cross-section 50". The radial SMA springs 44a", 44b" with two protrusions 56 may have twice as much stiffness as compared with the radial SMA springs 44a', 44b' of FIG. 9 that have one center protrusion 54. The top view 52" of the radial SMA springs 44a", 44b" having the cupped cross-section 50" with the two protrusions 56 is also shown in FIG. 10.

Figure 11:
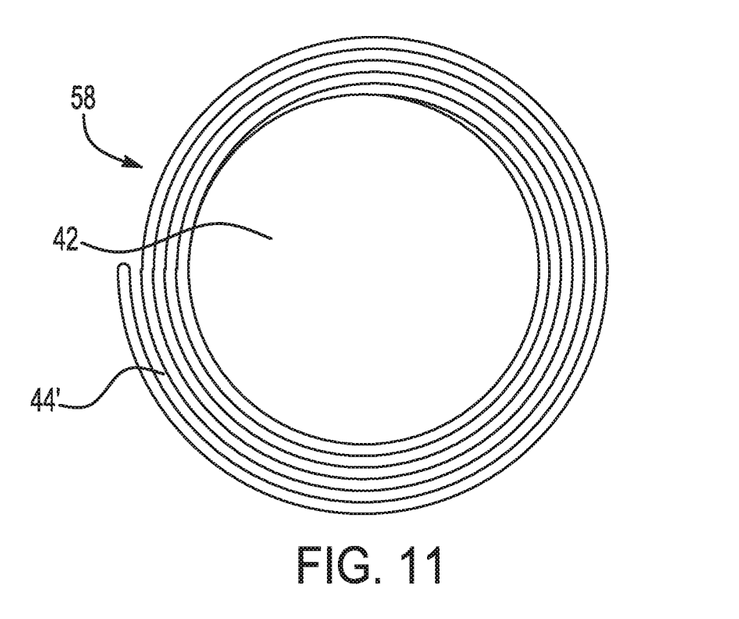
FIG. 11 shows an SMA deployment body for the sensor array of FIG. 1 according to still another exemplary embodiment.

Referring now to FIG. 11, still another embodiment of the deployment body 58 is shown in which a single radial SMA spring 44' is attached to the central hub 42. The radial SMA spring 44' may include any of the features of the SMA springs described herein, and the radial SMA spring 44' is configured to rotate in a single rotational direction during deployment.

Figure 12:
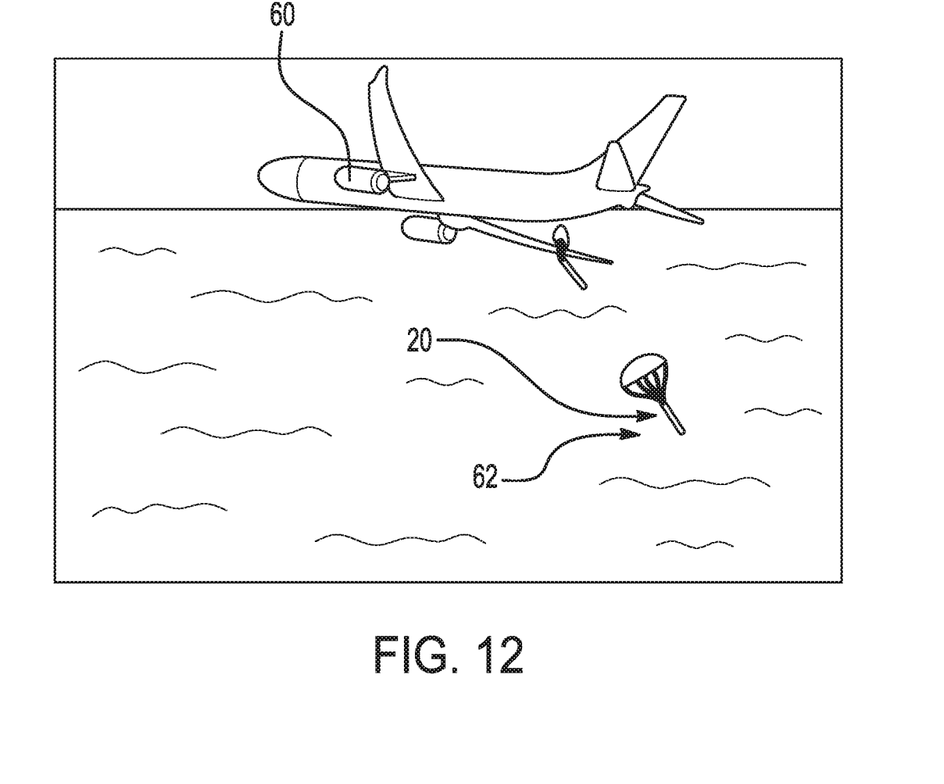
FIG. 12 shows an exemplary application in which a sonobuoy is delivered from a platform and includes the deployment module of FIG. 1.
Figure 13:
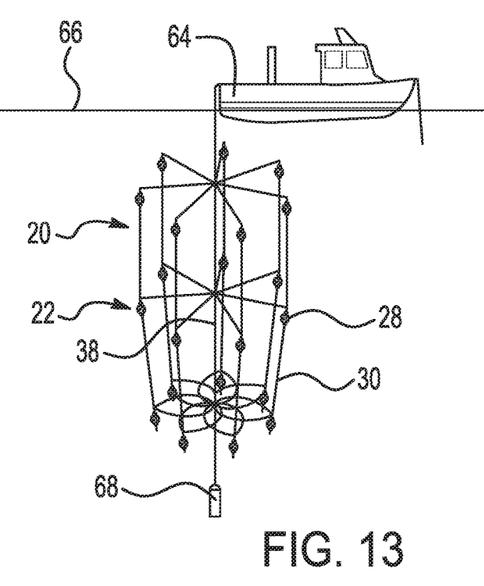
FIG. 13 shows an exemplary application in which the sensor array is deployed from the deployment module of FIG. 1.

Referring now to FIGS. 12 and 13, exemplary applications for the deployment module 20 (shown in FIGS. 1 and 2) including the deployment body 24, 40, 58 (shown in FIGS. 1-11) are shown. FIG. 12 shows the deployment module 20 being deployed from a platform 60 that is shown as an aircraft. In other exemplary applications, the platform 60 may be a sea vessel or land vehicle. The deployment module 20 may be arranged in a sonobuoy 62 that is deployed from the platform 60. FIG. 13 shows the deployment module 20 and the deployed sensor array 22 after deployment from a sea vessel 64, or after the deployment module 20 is deployed from an aircraft and connected to a sea vessel 64. After deployment, the sensor array 22 is a volumetric array such that the sensors 28 and the cable 30 are arranged in a vertically extending three-dimensional arrangement, or a two-dimensional arrangement. The sensor array 22 is operable for the intended application when in the deployed state.

In an exemplary application, prior to the subsequent deployment of the sensor array 22, the sonobuoy 62 including the deployment module 20 is deployed by the platform 60, such as the aircraft shown in FIG. 12, toward the water. A release mechanism may be provided for the initial release of the deployment module 20 from the platform 60. A buoyant portion of the sonobuoy 62, or the sea vessel 64 if deployment of the deployment module 20 occurs from the sea vessel 64, remains on the surface of the water 66 and a weighted portion 68 of the sonobuoy 62 is displaced and travels downwardly to deploy the sensor array 22 through the water, such that the deployment module 20 is in a vertical orientation during and after deployment.

The weighted portion 68 or another bottom portion of the deployment module 20 may also include a battery pack to power the sensor array 22. The battery pack may be in communication with the central electro-mechanical cable 38 for supplying power to the cable 30. Electronics and radio may also be provided for processing data, such as telemetry data, that is received from the sensor array 22. The data may be communicated to the sea vessel 64 via the cables 30 through the central electro-mechanical cable 38 and up to a main control system located in the sea vessel 64. The control system receiving data from the sensor array 22 may be located proximate the sensor array 22 or remote from the sensor array 22.

Figure 14:
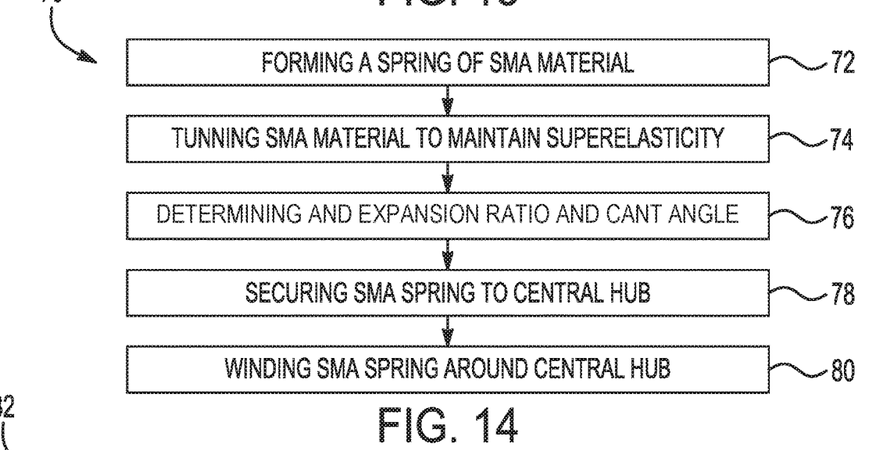
FIG. 14 shows a flowchart illustrating a method of forming an SMA deployment body.

FIG. 14 shows a flowchart for a method 70 of forming a deployment body that is engageable with a sensor array for deploying the sensor array, such as the deployment body 24, 40, 58 shown in FIGS. 1-11, and the sensor array 22 shown in FIGS. 1 and 2. Step 72 of the method 70 includes forming the SMA spring 44 of an SMA material, such a nickel-titanium alloy. Step 74 of the method 70 includes tuning the SMA material to maintain a predetermined superelasticity based on at least one of an operating temperature for the deployment body 24, 40, 58 and a desired expansion ratio of stowed to deployed diameter of the deployment body 24, 40, 58. Step 74 may include adjusting a stiffness of the SMA spring 44 by forming a protrusion 54, 56 in the SMA spring 44 (as shown in FIGS. 9 and 10) to change a cross-section of the SMA spring 44.

Step 76 of the method 70 includes selecting a desired expansion ratio of the deployment body 24, 40, 58 based on the application and determining a predetermined cant angle θ that corresponds to the expansion ratio. Step 78 of the method 70 includes securing the SMA spring 44 to the central hub 42 at the determined cant angle θ. Step 80 of the method 70 includes winding the SMA spring 44 around the central hub 42 to assembly the deployment body 24, 40, 58 in the stored position prior to deployment. Step 80 may include winding the SMA spring 44 around the central hub 42 at a temperature that is lower than a temperature at which the SMA spring 44 is attached to the central hub 42. Step 80 may further include bending the SMA spring 44 at a minimal bend radius to prevent plastic deformation of the SMA material.

Figure 15:
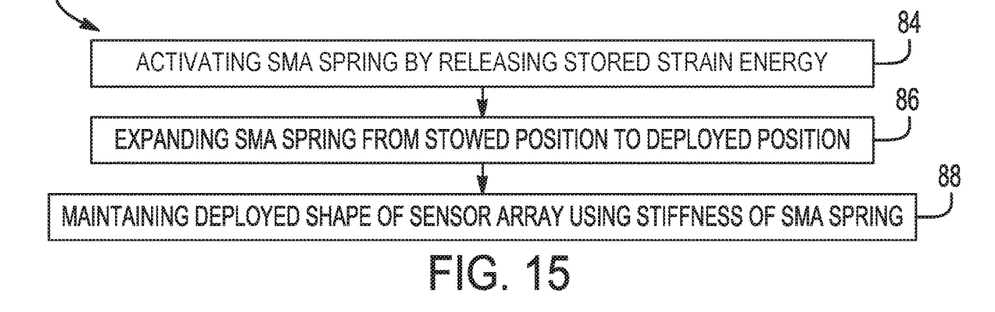
FIG. 15 shows a flowchart illustrating a method of deploying a sensor array using an SMA deployment body.

Referring now to FIG. 15, a flowchart showing a method 82 of deploying a sensor array, such as the sensor array 22 shown in FIGS. 1 and 2. Step 84 of the method 82 includes activating a shape memory alloy spring by releasing stored strain energy. The activation may be caused by mechanical or thermal activation. Step 86 of the method 82 includes expanding the SMA spring 44 from a stowed position in which the SMA spring 44 is wound around a central hub 42 toward a deployed position. Step 88 of the method 82 includes maintaining a deployed shape of the sensor array 22 using a stiffness of the SMA spring 44.

Using the deployment body according to any of the embodiments described herein is advantageous in enabling passive or active activation and deployment of a sensor array with a less complex and reliable structure. The SMA material is tunable for specific applications such that the deployment may be controlled. The deployment body may be suitable for use in many different applications. Examples of specific applications that are suitable include the deployment of hydrophone arrays into water, the deployment of RF antennas in space for satellites, and in solar arrays. Spherical and parabolic antennas may be suitable. Other RF and acoustic applications may be suitable. The deployment body may be sized up or down, such that the principles described herein may be suitable for use in micromechanical systems.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A deployment body engageable with a sensor array for deploying the sensor array, the deployment body comprising:
    a central hub; and
        at least one spring connected between the central hub and the sensor array, the at least one spring being expandable from a stowed position in which the at least one spring is wound around the central hub and a deployed position in which the at least one spring is expanded radially outwardly from the central hub to maintain a deployed shape of the sensor array,
        wherein the at least one spring is formed of a shape memory alloy material that enables passive activation of the at least one spring in which the at least one spring expands from the stowed position toward the deployed position.

2. The deployment body according to claim 1, wherein the at least one spring has stored strain energy when in the stowed position, and wherein the stored strain energy is released during the passive activation of the at least one spring.

3. The deployment body according to claim 1, wherein the shape memory alloy material is configured for the passive activation when the shape memory alloy material is heated.

4. The deployment body according to claim 3, wherein the shape memory alloy material is configured for the passive activation in response to a current being applied to the shape memory alloy material.

5. The deployment body according to claim 1, wherein the shape memory alloy material is a nickel-titanium alloy.

6. The deployment body according to claim 1, wherein the at least one spring includes a plurality of springs.

7. The deployment body according to claim 6, wherein the plurality of springs includes at least two springs that are configured to counterrotate relative to each other during the passive activation.

8. The deployment body according to claim 7, wherein the plurality of springs includes a plurality of clockwise rotating springs and a plurality of counterclockwise rotating springs.

9. The deployment body according to claim 6, wherein the plurality of springs are all configured to rotate in a same rotational direction during the passive activation.

10. The deployment body according to claim 1, wherein the at least one spring includes a plurality of radial springs and a plurality of circumferential springs that have different elasticity.

11. The deployment body according to claim 10 further comprising a plurality of staves, wherein the plurality of circumferential springs are connected between the plurality of staves for spacing the plurality of staves when in the deployed position.

12. The deployment body according to claim 11, wherein each of the plurality of radial springs is connected between the central hub and one of the plurality of staves.

13. The deployment body according to claim 6, wherein the plurality of springs are arranged in a symmetrical pattern when in the deployed position.

14. The deployment body according to claim 1, wherein the at least one spring includes only one spring that is rotatable in one rotational direction.

15. A deployment module comprising:
    a sensor array having a plurality of sensors and a cable connecting the plurality of sensors; and
    a deployment body arranged adjacent the sensor array and having a central hub, and a plurality of springs connected between the central hub and the cable of the sensor array, the plurality of springs being expandable from a stowed position in which the plurality of springs are wound around the central hub and a deployed position in which the plurality of springs are expanded radially outwardly from the central hub to maintain a deployed shape of the sensor array,
    wherein the plurality of springs are formed of a shape memory alloy material that enables passive activation of the plurality of springs in which at least two of the plurality of springs are configured to counter-rotate relative to each other during expansion from the stowed position toward the deployed position.

16. A method of forming a deployment body that is engageable with a sensor array for deploying the sensor array, the method comprising:
    forming at least one spring of a shape memory alloy material;
    tuning the shape memory alloy material to maintain a predetermined superelasticity based on at least one of an operating temperature for the deployment body and a speed of actuation of the deployment body;
    securing the at least one spring to a central hub, the at least one spring being expandable from a stowed position in which the at least one spring is wound around the central hub and a deployed position in which the at least one spring is expanded radially outwardly from the central hub to maintain a deployed shape of the sensor array; and
    winding the at least one spring around the central hub.

17. The method according to claim 16 further comprising:
    selecting a spin rate for the deployment body; and
    determining a cant angle between the at least one spring and the central hub based on the spin rate; and
    securing the at least one spring to the central hub at the determined cant angle.

18. The method according to claim 16 further comprising adjusting a stiffness of the at least one spring by at least one of:
    forming a protrusion in the at least one spring to change a cross-section of the at least one spring; and
    changing a thickness of the at least one spring.

19. The method according to claim 16 further comprising:
    forming the at least one spring of the shape memory alloy material at a first temperature; and
    winding the at least one spring around the central hub at a second temperature different than the first temperature.

20. The method according to claim 16, wherein winding the at least one spring around the central hub includes bending the at least one spring at a minimal bend radius to prevent plastic deformation of the shape memory alloy material.

* * * * *